Jan. 15, 1963
R. V. OXFORD
3,073,657
ROTARY SEAL
Filed July 18, 1960
2 Sheets-Sheet 1
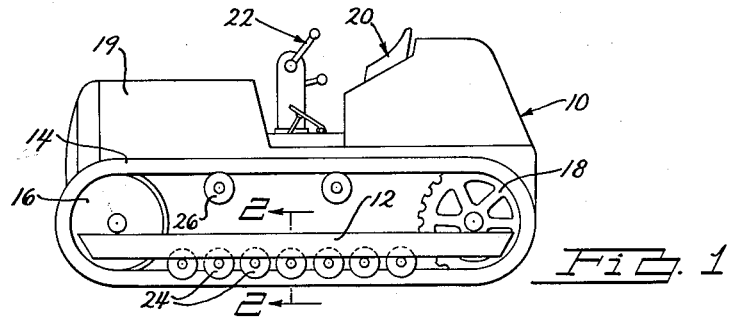
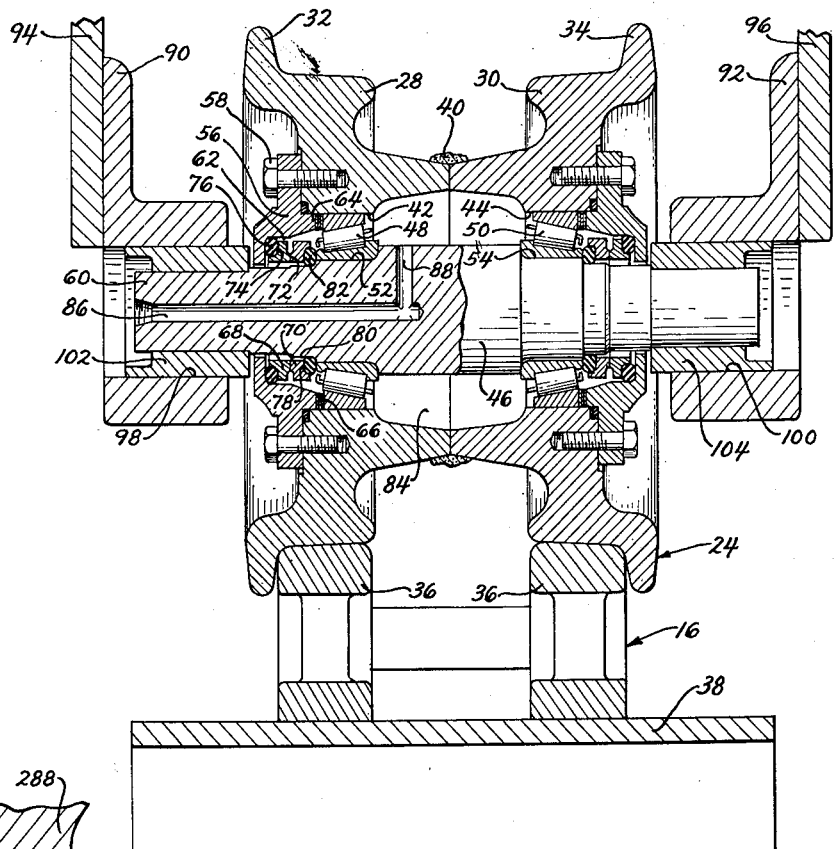
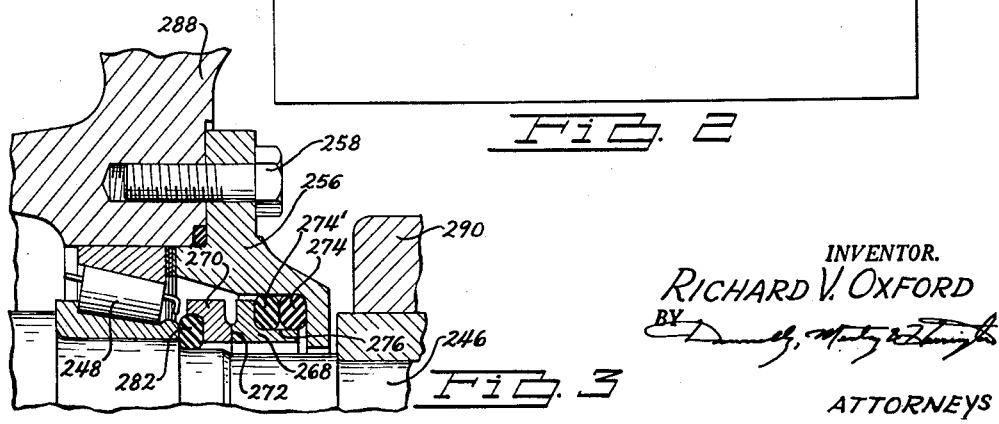
INVENTOR.
RICHARD V. OXFORD
BY
ATTORNEYS

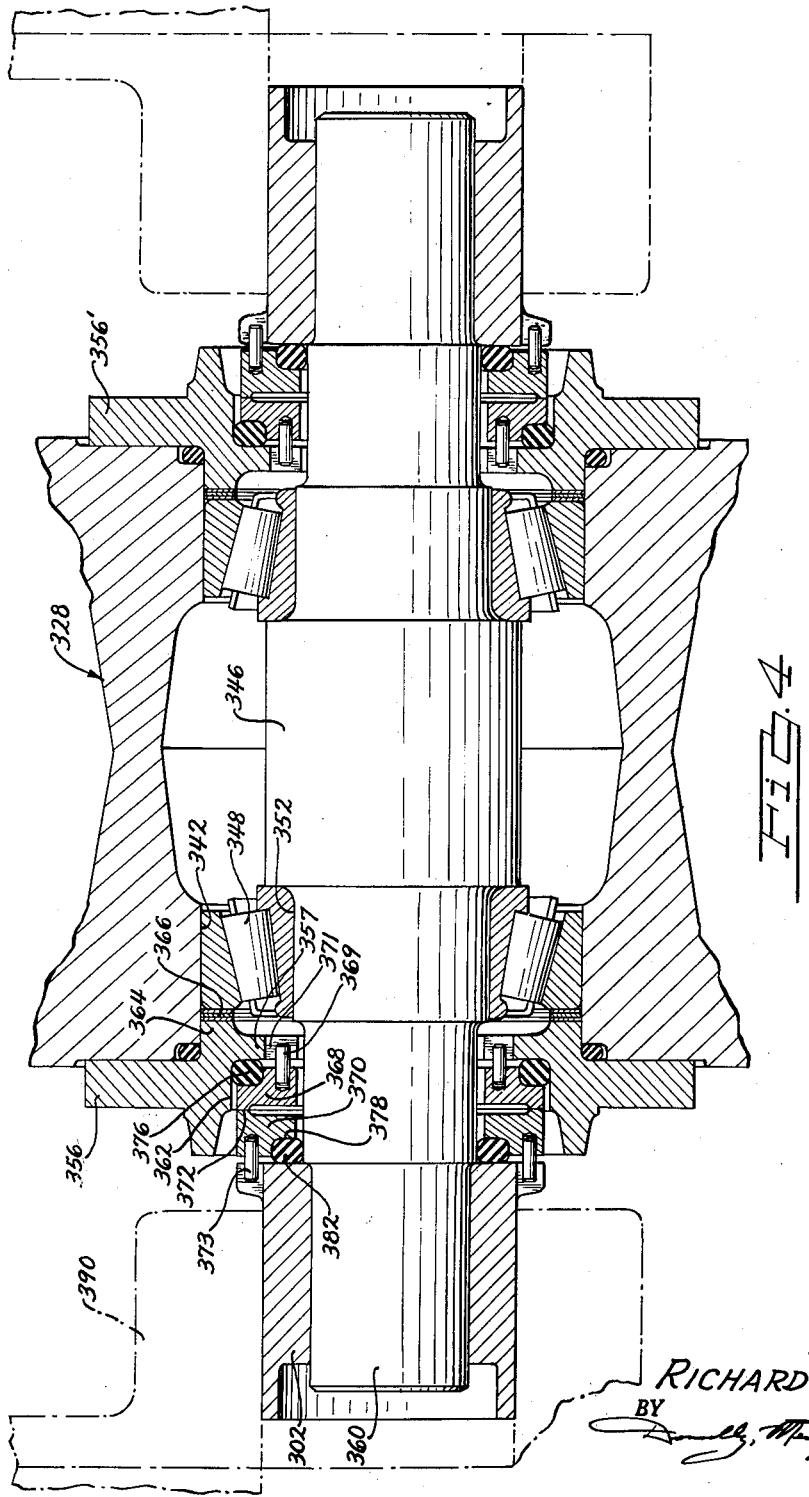

3,073,657
ROTARY SEAL
Richard V. Oxford, Bloomfield Township, Oakland County, Mich., assignor to Jered Industries, Inc., Hazel Park, Mich., a corporation of Michigan
Filed July 18, 1960, Ser. No. 43,358
6 Claims. (Cl. 308—187.1)

My invention relates generally to fluid sealing structures, and more particularly to a rotary fluid seal assembly capable of containing lubricant for the bearings of a rotary member.

The improved seal assembly of my invention is adapted particularly to be used with track rollers for track laying vehicles such as crawler tractors. In such vehicles the track is mounted in an endless fashion between a driving wheel and a main idler wheel, and track rollers are situated between the driving wheel and the main idler wheel for the purpose of distributing the load of the vehicle over the track. Additional rollers are provided for supporting the track on the return side of the track circuit.

It is conventional practice to mount the track rollers on roller shafts that are secured to a relatively stationary vehicle frame structure, and to employ spaced bearing means for journalling each roller on its respective shaft. It is good design practice to maintain a supply of lubricant within each roller hub in the region of the bearing means so that repeated servicing of the rollers will not be necessary.

This lubrication method gives rise to special lubricant sealing problems that cannot be overcome with rotary seals of usual construction. For example, the track rollers usually are exposed to water and dirt when the vehicle is in use. The seal assembly nevertheless must provide effective sealing action by excluding such foreign matter from the internal bearing region.

Certain seal assemblies that have been used commercially in applications of this type employ a pair of sealing rings with cooperating, relatively movable sealing surfaces, said rings being disposed concentrally about the roller shaft. These seal assemblies are, however, somewhat inadequate in their ability to withstand the extreme operating conditions that are often experienced with track laying vehicles since they are incapable of producing the necessary sealing pressure on the sealing rings. This is especially true after the seal has been used for a prolonged period. Foreign matter then will be allowed to pass the sealing surfaces and cause bearing damage which in turn necessitates costly repairs and service time. Further, it is necessary to replace periodically the lubricant that is lost through such sealing assemblies.

The provision of an improved sealing structure being a principal object of my invention, it is a further object of my invention to provide a seal assembly in which provision is made for applying a sealing force of substantial magnitude to relatively movable sealing surfaces.

The bearing means which are used with track rollers of the type above described are usually capable of accommodating axial thrust loads as well as radial bearing loads. Further, the rollers are capable of accommodating a limited degree of axial end play because of accumulated manufacturing tolerances. The bearings are capable of accommodating this end play.

The sealing pressure which is applied to the sealing elements of seal assemblies of known construction is influenced by this end play. This in turn results in a variation in the sealing action. It is therefore a further object of my invention to provide a seal assembly for use with track rollers wherein the sealing action is not influenced adversely by end play of the roller.

Another principal disadvantage of sealing assemblies of known construction resides in the relatively complex assembly and disassembly procedures that are required when the track mechanism is under repair. In order to remove the rollers it is necessary to disassemble the sealing structure. This is of considerable disadvantage when it is necessary to make repairs in the field. It is therefore another object of my invention to provide a seal assembly for a track roller wherein the components of the sealing structure may be retained in place when the track rollers are removed from their mounting structure.

It is a further object of my invention to provide a track roller of the type above set forth wherein the sealing structure defines a part of the roller assembly and forms therewith a self-contained unit.

When the track vehicle is parked for a time, the presence of dirt and water may tend to cause the relatively movable sealing elements to freeze together. When the vehicle is operating under power, one of the sealing surfaces must be driven with the roller, and this requires a breaking away of the sealing elements from each other. I have therefore made provision for obtaining this breaking action in a positive fashion. This eliminates the possibility of damaging the sealing structure due to the application of torque to the rollers while the sealing elements are frozen together.

It is a further object of my invention to provide a seal assembly of the type above described and which is further characterized by its simplicity of construction. Further, my improved seal assembly is adapted to incorporate components that are readily commercially available.

For the purpose of more particularly describing my improved construction, reference will be made to the accompanying drawings wherein:

FIG. 1 represents in schematic form the outline of a tracked vehicle capable of accommodating rollers having my improved seal assembly;

FIG. 2 is a radial cross sectional view of a track roller, and is taken along section line 2—2 of FIG. 1;

FIG. 3 is a partial radial cross sectional view of a portion of a track roller assembly incorporating a modified seal assembly that embodies my invention; and FIG. 4 is a partial cross sectional view of a track roller incorporating a second modified seal assembly which embodies my invention.

Referring first to FIG. 1, numeral 10 designates the body of a small track laying vehicle and numeral 12 generally designates a portion of the vehicle chassis. An endless driving track is shown at 14 and it includes a main idler wheel 16 and a driving wheel 18. The wheel 18 can be powered by means of an engine contained within an engine compartment 19. A suitable power transmission mechanism can be used for connecting the engine 19 to the wheels 18. A suitable compartment for a vehicle operator is generally designated by the numeral 20, and vehicle controls are shown at 22.

Track rollers are shown at 24 and they are mounted on the vehicle frame that forms a part of chassis 12.

The rollers 24 engage a track 16 and function to distribute the weight of the vehicle over the track. Supporting rollers 26 are situated on the return side of the track circuit for supporting the weight of the track.

Referring next to FIG. 2, the rollers 24 are comprised of two sections identified by reference characters 28 and 30, respectively. Each of the sections 28 and 30 is formed with a rim portion defined in part by radial flanges 32 and 34, respectively, said rim portions cooperating with runners 36 of the track 14. Ground engaging cleats 38 may be secured to the runners 36.

The sections 28 and 30 can be secured together in juxtaposed relationship by means of a peripheral weld 40 thereby forming a unitary wheel. The roller sections 28 and 30 are each formed with a central opening 42 and 44, respectively, through which a roller shaft 46 extends. A tapered roller bearing unit 48 is received within aperture 42 of roller section 28 and a tapered roller bearing unit 50 is received within aperture 44 of roller section 30. The bearing units 48 and 50 are adapted to rotatably support the roller on the shaft 46.

A bearing seat for the unit 48 is shown at 52 and a corresponding bearing seat for bearing unit 50 is shown at 54, the diameters of the bearing seats 52 and 54 being smaller than the diameter of the central portion of the roller shaft 46 so that an annular reaction shoulder is provided for each bearing unit 48 and 50.

A bearing cap 56 is secured to the left side of the roller, as viewed in FIG. 2, by means of bolts 58. This bearing cap is circular in form and it extends radially inward so that it overlies the aperture 42. The cap 56 is centrally apertured so that one extended end 60 of shaft 46 can be received therethrough, as indicated.

The cap 56 defines an internal recess 62 of substantially rectangular cross section, and it includes a pilot portion 64 which is telescopically received within the aperture 42. A shim pack 66 can be situated between the pilot portion 64 and the outer race of the bearing unit 48 in order to properly position the bearing unit 48 against the reaction shoulder for the inner race.

A first sealing ring 68 is situated within the recess 62 and second sealing ring 70 is disposed in adjacent sliding relationship with respect to sealing ring 68. The sealing rings 68 and 70 are of circular shape, and they are each formed with an annular sealing surface, said surfaces being identified in FIG. 2 by the common reference numeral 72.

Sealing ring 68 is formed with a groove of rectangular shape as shown at 74, and it cooperates with a recess 62 to define a space within which a circular O-ring 76 is disposed. In a similar fashion, sealing ring 70 is formed with a groove 78 of generally rectangular cross section, and it cooperates with the end of the inner race of bearing unit 48 and with a shoulder 80 on shaft 46 to define a space within which is situated another circular O-ring 82. The O-rings 76 and 82 are adapted to exert an axially directed clamping force on the sealing rings 68 and 70 so that the sealing surfaces 72 are maintained firmly in sealing engagement. The sealing surfaces 72 are located at the radially inward extremity of the sealing rings 68 and 70.

The interior of the hub for the roller defines a chamber 84 which contains lubricant for the bearing units 48 and 50. This lubricant can be injected into the chamber 84 through an axially extending passage 86 and a communicating radial passage 88, both of these passages being formed in the shaft 46. A suitable fluid pressure fitting can be threadably connected to the end 60 of shaft 46 so that it communicates with the passage 86.

The bearing and seal structure on the right hand side of the roller as viewed in FIG. 2 can be the same as the above described bearing and seal structure, and a particular description of this portion of the assembly is therefore not necessary.

The shaft 46 can be end supported or straddle mounted by means of brackets 90 and 92 that in turn are secured to portions of the vehicle frame as shown at 94 and 96, respectively. Brackets 90 and 92 are apertured as shown at 98 and 100 to accommodate sleeves 102 and 104, respectively. These sleeves receive the ends of the shaft 46 to provide a straddle mounting. The roller shaft 46 is thereby held stationary.

It is apparent from the foregoing that the compressive forces acting on the O-rings for the seal assembly act directly on the sealing rings to provide a sealing pressure, and these forces can be of a relatively high order of magnitude. Also, the sealing elements are completely shrouded and protected against exterior dirt and other foreign matter. If any water or mud should enter the region of the sealing rings, it will be drained free before the sealing rings become frozen. Further, there is little or no possibility of the sealing rings becoming frozen to the relatively stationary parts of the sealing structure.

Referring next to FIG. 3, I have illustrated a modified construction embodying my invention. The parts of the construction shown in FIG. 3 have been designated by reference characters which correspond to those reference characters used in the description of the construction of FIG. 2, although the reference characters in FIG. 3 are all in the 200 series. The construction of FIG. 3 differs, however, from the construction of FIG. 2 by reason of the provision of double O-rings shown at 274 and 274'. Further, one sealing ring 268 is formed with an annular groove having a relatively large axial length for accommodating the two O-rings. Ring 268 is formed with an annular sealing surface 272 which cooperates with a corresponding annular sealing surface on an adjacent sealing ring 270. The bearing cap 256 is formed with a relatively extended radial flange for accommodating the extended sealing ring 268 and the O-rings 274 and 274'.

The sealing ring 268 and the sealing ring 270 cooperate in the same fashion as the corresponding sealing rings of the construction of FIG. 2. The ring 270 is maintained in a relatively stationary position while the ring 268 rotates with the roller. The construction of FIG. 3 is capable of accommodating a relatively large degree of axial end play without a corresponding reduction in the sealing forces applied to the sealing rings. Both of the seal constructions of FIGS. 2 and 3 form a part of an integral assembly with the roller, and the roller may be removed as a unit during repair from the supporting brackets on the frame without the need for disassembling the seal itself.

Referring to the modification of FIG. 4, I have shown an alternate seal construction comprising a pair of end caps 356 and 356' which are secured to a roller generally identified by reference character 328. The rim of roller 328 is adapted to cooperate with a track of the type shown in FIG. 2, and it is centrally apertured as shown at 342 for accommodating a bearing unit 348. A roller shaft 346 is used for rotatably supporting the roller 328, and it is formed with a reduced diameter portion 352 that cooperates with the central portion to define an annular reaction shoulder for the inner race of bearing unit 348. The cap 356 is formed with a pilot 364 that extends within recess 342, and a shim pack 366 may be used for suitably positioning the bearing unit 348.

The cap 356 is formed with an internally extending flange 357 that defines in part an annular recess of rectangular cross section as shown at 362. A sealing ring 368 is situated within recess 362, and it is formed with a rectangularly shaped annular recess which cooperates with the recess 362 to contain a first O-ring 376.

A second sealing ring 370 is situated adjacent sealing ring 368, and it is formed with an annular sealing surface 372 that cooperates with a corresponding sealing surface on the sealing ring 368. These sealing surfaces are located at the radially outward extremity of the sealing rings. Sealing ring 370 is formed with an annular groove of rectangular cross section 378 for accommodating a second O-ring 382.

The end 360 of shaft 346 extends through a sleeve 302 that in turn is supported by a bracket 390 connected to the vehicle frame. The end of sleeve 302 engages O-ring 382 and exerts thereon an axial pressure which is transmitted to the sealing rings 370 and 368 to provide a sealing pressure. A similar axial force is exerted on the sealing rings by the O-ring 376.

In order to provide a positive breaking action between the sealing rings, a pin 369 is inserted in a cooperating opening in sealing ring 368, and it extends outwardly into a slot 371 formed in the shoulder 357 of cap 356. Relative rotation of the roller will cause the pin 369 to drive the ring 368 and carry it along so that the ring 368 on the roller will rotate in unison at all times regardless of whether or not the sealing rings are frozen together following a period in which the vehicle is inoperative. In a similar fashion, the ring 370 carries a pin 373 which extends within a cooperating opening in the stationery sleeve 302. The pin 373 funtctions to lock the ring 370 in a stationary position so that the ring 370 will not be carried along by the ring 368 under those operating conditions in which the rings become frozen.

The bearing and seal structure located at the right hand side of the roller unit shown in FIG. 4 is similar in form to the above description relating to the structure at the left hand side of the roller unit. Further, the shaft 346 can be straddle mounted in a fashion similar to the mounting means for the embodiments of FIGS. 2 and 3.

In each of the embodiments, the O-rings perform the additional function of piloting the sealing rings with respect to each other and for maintaining the same in proper spaced relationship with respect to the roller shaft and the surrounding roller.

Having thus described the principal features of my invention, what I claim and desire to secure by United States Letters Patent is:

1. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, said rings having juxtaposed annular surfaces situated in sealing engagement, an annular shoulder formed on said shaft adjacent one sealing ring, an annular O-ring situated between said one sealing ring and said shoulder, an adaptor carried by said roller including a portion extending radially inward adjacent the other sealing ring, and a second O-ring situated between said inwardly extending portion and said other sealing ring, said O-rings urging said sealing rings together into sealing engagement whereby lubricant is retained within said roller.

2. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, said rings having juxtaposed annular surfaces situated in sealing engagement, a first annular O-ring situated adjacent said one sealing ring, an adaptor carried by said roller including a portion extending radially inward adjacent the other sealing ring, and a second O-ring situated between said inwardly extending portion and said other sealing ring, said O-rings urging said rings together into relative sealing relationship whereby lubricant is retained within said roller, said fluid seal and said shaft forming a part of said roller assembly and defining therewith a composite, self-contained unit.

3. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, one side of each sealing ring having formed therein an annular sealing surface, said sealing surface being disposed in juxtaposed sealing engagement, an annular recess of rectangular cross section formed on the other side of each sealing ring, an annular shoulder formed on said shaft adjacent one sealing ring, a resilient means disposed in the annular recess of said one sealing ring and engageable with said shoulder, an adaptor carried by said roller including a portion extending radially inward adjacent the other sealing ring, and a second resilient means situated in the annular recess for said other sealing ring and engageable with said radially inward portion, said resilient means urging said sealing rings together into relative sealing relationship whereby lubricant is retained within said roller, the annular sealing surface for each sealing ring being situated at the radially inward extremity thereof, said shaft and said fluid seals forming a part of said roller assembly and defining therewith a composite, self-contained unit.

4. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, said rings having juxtaposed annular surfaces situated in sealing engagement, an annular shoulder formed on said shaft adjacent one sealing ring, an annular O-ring situated between said one sealing ring and said shoulder, a bearing retainer carried by said roller including a portion extending radially inward adjacent the other sealing ring, and a second O-ring situated between said inwardly extending portion and said other sealing ring, said O-rings urging said sealing rings together into sealing engagement whereby lubricant is retained within said roller, said bearing retainer being engageable with said bearing whereby said bearing is positioned in fixed relationship with respect to said shaft.

5. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, said rings having juxtaposed annular surfaces situated in sealing engagement, a bearing retainer carried by said roller including a shoulder extending in a radially inward direction, a first O-ring situated between said shoulder and one of said sealing rings, another fixed shoulder carried by said shaft, a second O-ring situated between said second shoulder and the other sealing ring, said O-rings being adapted to urge said sealing rings into sealing engagement, and means for positively connecting said one and said other sealing ring to said bearing adaptor and to said fixed shoulder, respectively, whereby relative rotation between said sealing rings is established whenever rotation of said roller on said shaft takes place.

6. In combination with a track roller assembly journalled for rotation about a fixed roller shaft, said assembly comprising two bearings disposed at axially spaced locations on said shaft, a fluid seal disposed adjacent each bearing comprising a first annular sealing ring, a second annular sealing ring, said sealing rings being concentrically disposed about said shaft, said rings having juxtaposed annular surfaces situated in sealing engagement, a bearing retainer carried by said roller including a shoulder extending in a radially inward direction, a first O-ring situated between said shoulder and one of said sealing rings, another fixed shoulder carried by said shaft, a second O-ring situated between said second shoulder and the other sealing ring, said O-rings being adapted to urge said sealing rings into sealing engagement, means for positively connecting said one and said other sealing ring to said bearing adaptor and to said fixed shoulder respectively whereby relative rotation between said sealing rings is established whenever rotation of said roller on said shaft takes place, said last named means comprising a pin carried by each sealing ring, means for restraining rotary movement of the pin associated with said one sealing ring relative to said bearing retainer and means for restraining rotary movement of the other pin relative to said shaft, the annular sealing surface for each sealing ring being situated at the radially outward extremity thereof.

References Cited in the file of this patent

UNITED STATES PATENTS

| | | |
|---|---|---|
| 2,647,025 | Deffenbaugh | July 28, 1953 |
| 2,835,515 | Solari | May 20, 1958 |
| 2,911,241 | Horvath et al. | Nov. 3, 1959 |
| 2,911,266 | Metzke | Nov. 3, 1959 |